(12) United States Patent
Fujimoto et al.

(10) Patent No.: US 8,338,053 B2
(45) Date of Patent: Dec. 25, 2012

(54) CONDUCTIVE SINTERED BODY, CONDUCTIVE MEMBER FOR FUEL CELL, FUEL CELL, AND FUEL CELL APPARATUS

(75) Inventors: Tetsuro Fujimoto, Kirishima (JP); Yuuichi Hori, Kirishima (JP)

(73) Assignee: Kyocera Corporation, Kyoto (JP)

( * ) Notice: Subject to any disclaimer, the term of this patent is extended or adjusted under 35 U.S.C. 154(b) by 542 days.

(21) Appl. No.: 12/162,336

(22) PCT Filed: Jan. 22, 2007

(86) PCT No.: PCT/JP2007/050926
§ 371 (c)(1),
(2), (4) Date: Jul. 25, 2008

(87) PCT Pub. No.: WO2007/086346
PCT Pub. Date: Aug. 2, 2007

(65) Prior Publication Data
US 2009/0011306 A1    Jan. 8, 2009

(30) Foreign Application Priority Data

Jan. 27, 2006 (JP) .................................. 2006-019578
Mar. 28, 2006 (JP) .................................. 2006-088042

(51) Int. Cl.
*H01M 4/48* (2010.01)
*H01M 8/10* (2006.01)
*H01M 4/00* (2006.01)
*H01M 4/13* (2010.01)
*H01M 4/60* (2006.01)
*C01F 17/00* (2006.01)

(52) U.S. Cl. ........ 429/489; 429/223; 429/224; 429/488; 423/263

(58) Field of Classification Search ................... 429/489, 429/469, 223, 224, 488; 423/263
See application file for complete search history.

(56) References Cited

U.S. PATENT DOCUMENTS
4,395,468 A * 7/1983 Isenberg ....................... 429/456
(Continued)

FOREIGN PATENT DOCUMENTS
JP          61080784 A       4/1986
(Continued)

OTHER PUBLICATIONS

Chinese language office action dated Apr. 26, 2011 and its English language translation for corresponding Chinese application 200780003765.9.

(Continued)

*Primary Examiner* — Patrick Ryan
*Assistant Examiner* — Julian Anthony
(74) *Attorney, Agent, or Firm* — DLA Piper LLP (US)

(57) ABSTRACT

The invention relates to a conductive sintered body capable of being effectively prevented from reduction-induced expansion, as well as to a conductive member for fuel cell, a fuel cell, and a fuel cell apparatus. The conductive sintered body contains a first composite oxide phase (59) based on lanthanum chromite and a second composite oxide phase (55) containing Mg and Ni, and around the second composite oxide phase (55), Ni (57) is deposited. Such a conductive sintered body is used for fuel cell. Further, a conductive member for such a fuel cell is composed of a fuel electrode layer (32) and an oxide electrode layer (34) with a solid electrolyte layer (33) held therebetween; and is used as an interconnector (35) of a fuel cell (30) which is provided with the interconnector (35) connected to the fuel electrode layer (32).

10 Claims, 5 Drawing Sheets

U.S. PATENT DOCUMENTS

| | | | |
|---|---|---|---|
| 5,411,767 A * | 5/1995 | Soma et al. | 427/453 |
| 5,795,502 A | 8/1998 | Terashi | |
| 6,099,985 A * | 8/2000 | Elangovan et al. | 429/535 |
| 7,351,487 B2 | 4/2008 | Yamashita et al. | |
| 2003/0224240 A1 | 12/2003 | Yamashita et al. | |

FOREIGN PATENT DOCUMENTS

| | | |
|---|---|---|
| JP | 08222238 A | 8/1996 |
| JP | 09092294 A | 4/1997 |
| JP | 09221357 A | 8/1997 |
| JP | 2004146334 A | 5/2004 |
| JP | 2005190737 A | 7/2005 |
| JP | 2005216619 A | 8/2005 |

OTHER PUBLICATIONS

PCT Search Report for corresponding PCT application PCT/JP2007/050926.

Chinese language office action dated Jun. 6, 2012 and its English language translation issued in corresponding Chinese application 200780003765.9.

* cited by examiner

CONDUCTIVE SINTERED BODY, CONDUCTIVE MEMBER FOR FUEL CELL, FUEL CELL, AND FUEL CELL APPARATUS

CROSS-REFERENCE TO RELATED APPLICATIONS

This application is a national stage of international application No. PCT/JP2007/050926, filed on Jan. 22, 2007, and claims the benefit of priority under 35 USC 119 of Japanese Patent Application No. 2006-019578, filed on Jan. 27, 2006, and Japanese Patent Application No. 2006-088042, filed on Mar. 28, 2006. The entire contents of these applications are incorporated herein by reference.

TECHNICAL FIELD

The invention relates to a conductive sintered body, a conductive member for fuel cell, a fuel cell, and a fuel cell apparatus, and in particular to the conductive sintered body, conductive member for fuel cell, fuel cell, and fuel cell apparatus which are small in volume changes depending on oxygen partial pressure of lanthanum chromite-based conductive sintered body.

BACKGROUND ART

A lanthanum chromite-based conductive sintered body is excellent in chemical stability at high temperature as well as being high in electron conductivity, and has therefore been used for a separator, an interconnector, or the like, of a solid electrolyte fuel cell.

FIG. 1 shows one example of a solid electrolyte fuel cell, and FIG. 2 shows one example of a cell stack of the solid electrolyte fuel cell. The cell stack has a structure that a plurality of fuel cells 30 are assembled in lines with a current collector 40 made of a metal felt or the like interposed between one fuel cell and another fuel cell adjacent thereto, thereby electrically connecting a fuel electrode layer 32 of one fuel cell to an oxygen electrode layer (air electrode) 34 of another fuel cell.

The fuel cell 30 is constituted by sequentially disposing the fuel electrode layer 32, a solid electrolyte layer 33, and the oxygen electrode layer 34 made of conductive ceramics, on an outer circumferential surface of a cermet-made support base 31 (which is conductive and of which inner part serves as a fuel gas passage) having flat-tube shape, and there is an interconnector 35 provided on a surface of support base 31 which is not covered by the solid electrolyte layer 33 or the oxygen electrode layer 34. As is obvious from FIG. 2, the interconnector 35 is electrically connected to the support base 31 so as not to be connected to the oxygen electrode layer 34.

The interconnector 35 is made of conductive ceramics less susceptible to fuel gas and oxygen-containing gas such as air, which conductive ceramics has to be so dense as to be a reliable block between the fuel gas flowing through the support base 31 and the fuel electrode layer 32 and the oxygen-containing gas flowing outside the oxygen electrode layer 34. In such a fuel cell, power is generated at high temperature by flowing the fuel gas (hydrogen) through a fuel gas passage 31a of the support base 31 as well as flowing the air (oxygen) through the oxygen electrode layer 34.

Further, the current collector 40, which is disposed between the fuel cells adjacent to each other, is electrically connected to the support base 31 of one fuel cell with the interconnector 35 therebetween and moreover connected to the oxygen electrode layer 34 of the other fuel cell, whereby the adjacent fuel cells are connected in series.

In the fuel cell constituting the above fuel cell apparatus, the support base 31 is mainly formed of Ni and $Y_2O_3$; the fuel electrode layer 32 is formed of $ZrO_2$ (YSZ) containing Ni and $Y_2O_3$; the solid electrolyte layer 33 is formed of $ZrO_2$ (YSZ) containing $Y_2O_3$; the oxygen electrode layer 34 is formed of lanthanum ferrite-based perovskite composite oxide; and the interconnector 35 is formed of lanthanum chromite-based perovskite composite oxide, with the result that the respective members can be formed by simultaneous firing. This is called a co-sintering method, and the co-sintering method requires a small number of production steps and is therefore advantageous in enhancement of yield and cost reduction in manufacturing the cell. In particular, it is known that close coefficients of thermal expansion of the respective members result in a fuel cell not suffering from cracks or flaking (refer to Japanese Unexamined Patent Publication JP-A 2004-146334, for example).

Lanthanum chromite constituting the interconnector is a poor sinterability in general and has been therefore considered to be unsuitable for co-sintering. As a solution for it, it is conventionally known that Mg or Al and Mn, Fe, Co, Ni, Znt Cu, V, and Ti are contained in B site of lanthanum chromite (refer to Japanese Unexamined Patent Publication JP-A 8-222238 (1996), for example).

However, the interconnector made of lanthanum chromite-based perovskite composite oxide has a large part thereof, except the surface of interconnector in contact with the air, reduced with the fuel gas (e.g., hydrogen) being supplied into the fuel gas passage formed in the support base at the occasion of reduction treatment for activating a catalyst metal or of actually generating power after fired, and the large part of interconnector expands with the support base between the interconnectors, possibly causing the whole cell to deform, damage, etc.

That is to say, lanthanum chromite, which is a chief material of the interconnector, is a p-type semiconductor oxide featuring hole conduction. A method is commonly known of doping an element small in valence number to increase the hole for the purpose of enhancement in conductivity, and such lanthanum chromite exhibits high conductivity in oxidative atmosphere and is stable even at high temperature. However, in reductive atmosphere, oxygen vacancy is generated and the hole is captured by the oxygen vacancy, which situation induces not only a decrease in the conductivity but also a change of Cr in valence number from quadrivant to trivalent, whereby an ion increases in radius and thus causes a crystal lattice to expand, resulting in the volume expansion. This is considered as a mechanism of reduction-induced expansion of the interconnector, and it is suggested that the B site may contain Mg and Ni as dopant causing small volume expansion (JP-A 8-222238 (1996)).

However, according to the above mechanism, lanthanum chromite is reduced to expand more or less, and the reduction-induced expansion is essentially unable to be prevented. This imposes a problem that it is difficult for the fuel cell to ensure its long-term reliability.

DISCLOSURE OF INVENTION

An object of the invention is to provide a conductive sintered body in which reduction-induced expansion can be effectively inhibited, as well as to a conductive member for fuel cell, a fuel cell, and a fuel cell apparatus.

The inventors have studied various materials which are reductive and shrinkable, for the purpose of essentially preventing an interconnector from being reduced and expanding, and as a result they have found that the purpose can be attained by compounding metal oxide from which a metal is deposited in reductive atmosphere, whereby the invention has been completed.

The conductive sintered body of the invention is characterized by containing the first composite oxide phase based on lanthanum chromate and the second composite oxide phase containing Mg and Ni. In the conductive sintered body as just stated, the second composite oxide phase is the second composite oxide phase containing Mg and Ni in oxidative atmosphere, and when exposed to reductive atmosphere, Ni is separated from the second composite oxide phase containing Mg and Ni and deposited around the second composite oxide phase, and then Ni oxide is converted to a metal Ni, thereby causing volume shrinkage. Accordingly, lanthanum chromite in the conductive sintered body is reduced to expand while being reduced to shrink attributable to Ni being separated from the composite oxide phase of Mg and Ni, which volume changes cancel each other out, thus making it possible to hold down the reduction-induced expansion of conductive sintered body.

Incidentally, the interconnector may be conceivably made of lanthanum chromite and NiO and in this case, lanthanum chromite is being reduced to expand while NiO is reduced to Ni when exposed to reductive atmosphere, therefore leading to shrinkage of the interconnector, with the result that the interconnector can be prevented from being reduced and expanding. However, such an interconnector is around 35% in porosity even when fired in the atmosphere at 1,500° C., and it is thus impossible to obtain a dense interconnector in low-temperature firing.

In the invention, the firing can be carried out at low temperature of 1,500° C. or less thanks to Mg contained in the second composite oxide phase and moreover, the interconnector can be prevented from being reduced and expanding in reductive atmosphere because the second composite oxide phase is present with Mg and Ni contained therein.

Such a sintered body is 0.08% or less in an absolute value of coefficient of reduction-induced linear expansion, and will not largely change even when used as a cell component.

Assuming that the composite oxide phase is represented by a composition formula $(Mg_{1-x}Ni_x)O$, it is desirable that $0.11 \leq x \leq 0.66$ be satisfied.

The conductive sintered body of the invention is characterized by further containing an oxide phase of liquid phase forming component. The oxide phase of liquid phase forming component is characterized by being a $Y_2O_3$ phase. The conductive sintered body of the invention can be fired at low temperature because it contains the oxide phase of liquid phase forming component, for example, the $Y_2O_3$ phase.

Further, the conductive member for fuel cell of the invention is characterized in that the above conductive sintered body is used for a fuel cell. Such a conductive member for fuel cell includes: a separator of a flat shape fuel cell; an interconnector of a cylindrical shaper a flat-tube shape, or the like shape; and an electrode for fuel cell.

The fuel cell of the invention is characterized by having a solid electrolyte layer held between electrode layers as well as an interconnector electrically connected to the electrode layers, the interconnector being formed of the above conductive sintered body. In such a fuel cell, the conductive sintered body can be prevented from being reduced and expanding as described above, with the result that the interconnector can be prevented from being reduced and expanding and that the fuel cell can be prevented from being deformed, warped, etc. In particular, the columnar fuel cell having a gas passage therein and having an interconnector formed longitudinally is easily deformed and therefore can be used suitably for the invention.

Further, the fuel cell of the invention is characterized in that the interconnector is provided on a fuel electrode layer containing Ni or on a conductive support having the fuel electrode layer formed therein. In such a fuel cell, the firing in the order of 1,500° C. causes Mi contained in the fuel electrode layer or in the conductive support having the fuel electrode layer formed therein to be diffused in the interconnector, and causes Mg contained in the interconnector to be diffused in the fuel electrode or in the conductive support, so that the interconnector has its composition changing and therefore exhibits a small inhibitory effect on the reduction-induced expansion in the case of co-firing the fuel electrode layer, the solid electrolyte layer, etc., and the interconnector to fabricate the fuel cell although the interconnector is made of a material sufficiently prevented from being reduced and expanding. In the invention, the interconnector contains an oxide phase of liquid phase forming component, for examples an $Y_2O_3$ phase, so that the fuel electrode layer, the solid electrolyte layer, etc., can be co-fired with the interconnector even at temperature lower than 1,500° C., for example, at 1,450° C. As a result, it is possible to prevent Ni in the fuel electrode layer or in the conductive support from being diffused into the interconnector and to prevent Mg in the interconnector from being diffused into the fuel electrode layer or into the conductive support, allowing for the interconnector to have a composition as designed and therefore making it possible to prevent the interconnector from being reduced and expanding.

Moreover, $Y_2O_3$ can be fired at low temperature without affecting properties such as dense and conductivity. As such an oxide phase of liquid phase forming component, $Sc_2O_3$ or $Yb_2O_3$ may be used other than $Y_2O_3$. It is desired that a content of such an oxide phase of liquid phase forming component be 10 parts by mass or less based on 100 parts by mass in total of the first composite oxide phase and the second composite oxide phase containing Mg and Ni.

The fuel cell of the invention may be, for example, favorably used for a household fuel cell carrying out load-follow operation, or favorably used as a fuel cell for a distributed fuel cell having an electric generating capacity of 0.5 to 1.5 KW.

The fuel cell apparatus of the invention is characterized in that a plurality of the above fuel cells are housed in a container. Such a fuel cell apparatus can be enhanced in long-term reliability.

BRIEF DESCRIPTION OF DRAWINGS objects, features, and advantages of the invention will be more explicit from the following detailed description taken with reference to the drawing.

BEST MODE FOR CARRYING OUT THE INVENTION

Figure 1:
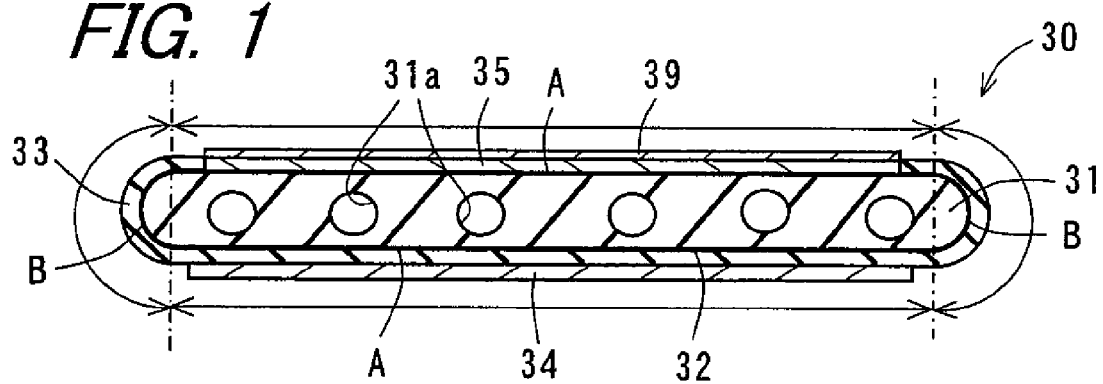
FIG. 1 is a transverse sectional view showing a fuel cell having a flat-tube shape.

Now referring to the drawings, preferred embodiments of the invention are described below.

Figure 2:
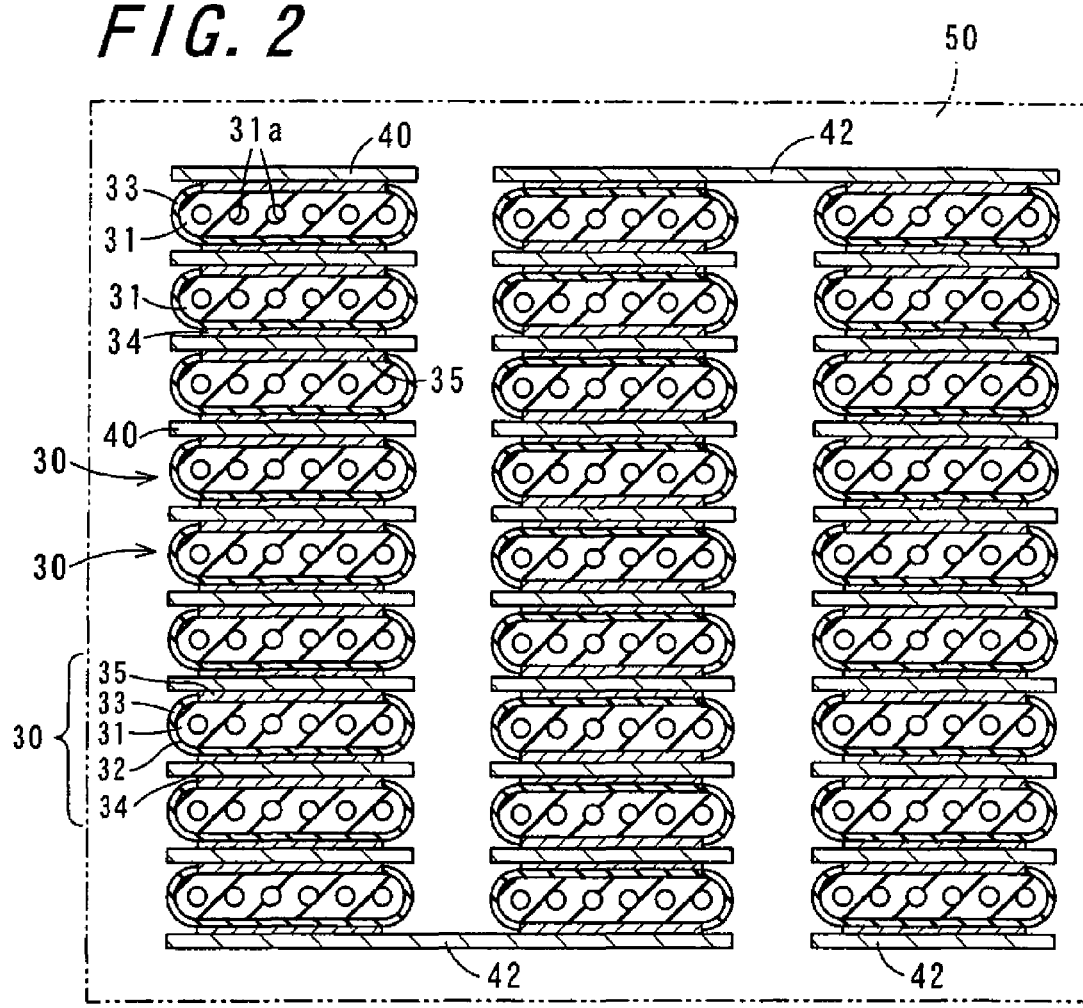
FIG. 2 is a transverse sectional view showing a cell stack formed of the fuel cell of FIG. 1.

FIG. 1 is a transverse sectional view showing a fuel cell of one embodiment of the invention. FIG. 2 is a transverse sectional view showing a cell stack formed of the fuel cell of FIG. 1. Note that the fuel cell and cell stack of the invention have similar structures to the fuel cell and cell stack explained in the background art, and the present embodiment will be explained with use of FIGS. 1 and 2 for convenience of explanation. A fuel cell denoted by 30 as a whole has a flat-tube shape with a flat section and is provided with a support base 31 in form of an elongated base on the whole. Inside the support base 31, a plurality of fuel gas passages 31a penetrating lengthwise are formed widthwise at appropriate intervals, and the fuel cell 30 has a structure in which various members are provided on the support base 31. A plurality of such fuel cells 30 are connected to each other in series by current collectors 40, whereby the cell stack constituting the fuel cell apparatus can be formed.

The support base 31 is composed of a flat portion A and arcuate portions B formed on both ends of the flat portion A as is understood from a shape shown in FIG. 1. Both surfaces of the flat portion A are formed in substantially parallel with each other, and a fuel electrode layer 32 is provided so as to cover one surface of the flat portion A and the arcuate portions B on both sides thereof and furthermore, so as to cover this fuel electrode layer 32, a dense solid electrolyte layer 33 is stacked and on this solid electrolyte layer 33, an oxide electrode layer 34 is stacked on one surface of the flat portion A so as to face the fuel electrode layer 32 across the solid electrolyte layer 33. Note that the fuel electrode layer 32 is indicated by a heavy line in FIG. 1. Herein, the fuel electrode layer 32 and the oxide electrode layer 34 may be collectively referred to as an electrode layer.

Further, an interconnector 35 is formed on the other surface of flat portion A on which the fuel electrode layer 32 and the solid electrolyte layer 33 are not stacked. As is clear from FIG. 1, the fuel electrode layer 32 and the solid electrolyte layer 33 extend to both ends of the interconnector 35 and are thus configured so that a surface of the support base 31 is not exposed to outside.

In the fuel cell configured as above, a part of fuel electrode layer 32 facing the oxide electrode layer 34 across the solid electrolyte layer 33 operates as a fuel electrode to generate power. That is to say, oxygen-containing gas such as air flows outside the oxygen electrode layer 34 while fuel gas (hydrogen) flows through the fuel gas passage 31a inside the support base 31, and heating up to a predetermined operating temperature causes electrode reaction in the oxygen electrode layer 34 and in the fuel electrode layer 32, whereby power is generated, and generated current is collected by the interconnector 35 mounted on the support base 31.

(Support Base 31)

The support base 31 needs to be permeable to fuel gas and therefore is preferably 30% or more in open porosity and 300 S/cm or more in conductivity, ordinarily. Further, of the support base 31, the flat portion A is ordinarily 15 to 35 mm in length and the arcuate portion B is in the order of 3 to 8 mm in length (arc length), and a thickness of the support base 31 (a distance between the both surfaces of the flat portion A) is desirably in the order of 1 to 5 mm.

The support base 31 is constituted so as to contain either of a catalytically active metal and oxide thereof, and an inorganic aggregate which generates no reaction product with the catalytic metal and oxide thereof, for example, metal oxide, i.e., solid electrolyte, or rare earth oxide containing at least one of rare earth elements, for the purpose of preventing the solid electrolyte from having cracks caused by volume expansion of the support base 31 in the reduction-oxidation cycle.

The catalytic metal includes iron group components such as Fe, Co, and Ni, and preferable are Ni and/or NiO which are stable in the fuel gas. As the inorganic aggregate, a material may be used that is equivalent to stabilized zirconia or lanthanum gallate-based perovskite composite of which the solid electrolyte layer 33 is formed in order to promote the electrode reaction (2) or in order to increase a so-called triphasic interface (interface of electrolyte/catalytic metal/gas phase), or alternatively rare earth oxide may be used in order to decrease a coefficient of thermal expansion close to the solid electrolyte layer 33. As the latter, oxide is used which contains at least one rare earth element selected from a group of So, Y, Lu, Yb, Tm, Er, Ho, Dy, Gd, Sm, and Pr, in particular. Specific examples of such rare earth oxide include $Sc_2O_3$, $Y_2O_3$, $Lu_2O_3$, $Yb_2O_3$, $Tm_2O_3$, $Er_2O_3$, $Ho_2O_3$, $Dy_2O_3$, $Gd_2O_3$, $Sm_2O_3$, and $Pr_2O_3$, and especially in terms of low cost, favorable are $Y_2O_3$ and $Yb_2O_3$ and furthermore $Y_2O_3$. Note that the support base 31 may contain other metal components or oxide components unless required characteristics are impaired.

(Fuel Electrode Layer 32)

The fuel electrode layer 32 is formed of conductive porous ceramics which is per se known, and is formed of, for example, $ZrO_2$ having solid solution of rare earth elements, and Ni and/or NiO. As $ZrO_2$ having solid solution of rare earth elements (stabilized zirconia), it is good to use a substance equivalent to those stated hereinbelow which are used to form the solid electrolyte layer 33. In the solid electrolyte layer 33, it is preferable that a content of stabilized zirconia preferably fall in a range of 35 to 65% by volume, and it is good to contain 65 to 35% by volume of Ni or NiO. Furthermore, the open porosity falls in a range of 20 to 40% in particular, and its thickness is desirably 1 to 30 µm. For example, of the fuel electrode layer 32, too small thickness may lower the performance while too large thickness may cause a peel-off, etc. due to a difference in thermal expansion.

In addition, although this fuel electrode layer 32 extends to both ends of the interconnector 35 in the example of FIG. 1, it is only necessary to form the fuel electrode layer so as to be present at a position facing the oxygen electrode layer 34 across the solid electrolyte layer 33 and accordingly, the fuel electrode layer 32 may be formed, for example, only on the flat portion A on which side the oxygen electrode layer 34 is provided. Furthermore, it is also possible to form the fuel electrode layer 32 over the entire periphery of the support base 31. In order to enhance joint strength between the solid electrolyte layer 33 and the support base 31, it is preferable that the whole solid electrolyte layer 33 be formed on the fuel electrode layer 32.

(Solid Electrolyte Layer 33)

The solid electrolyte layer 33 disposed on this fuel electrode layer 32 is generally formed of dense ceramics called $ZrO_2$ having solid solution (usually, stabilized zirconia) of 3 to 15 mol % rare earth element. Examples of the rare earth element include So, Y, La, Ce, Pr, Nd, Pm, Sm, Eu, Gd, Tb, Dy, Ho, Er, Tm, Yb, and Lu, among which Y and Yb are desirable in terms of low cost.

The stabilized zirconia ceramics forming this solid electrolyte layer 33 desirably has relative density (measured in the Archimedes method) of 93% or more, especially be so dense as 95% or more, and desirably has a thickness of 10 to 100 µm, from the aspect of prevention of gas permeation.

(Oxide Electrode Layer 34)

The oxygen electrode layer 34 is formed of conductive ceramics made of so-called $ABO_3$-type perovskite oxide. For such perovskite oxide, favorable is transition metal perovskite oxide or in particular, at least one of $LaMnO_3$-based oxide, $LaFeO_3$-based oxide, and $LaCoO_3$-based oxide, each of which has La in A-site and among which $LaFeO_3$-based oxide is especially preferable in terms of a high electric conducting property at around 600 to 1,000° C. operating temperature. Note that in the above perovskite oxide, Sr or the like may exist in the A-site with La and furthermore, Co and Mn may exist in the B-site with Fe.

Moreover, the oxide electrode layer 34 has to be gas-permeable and accordingly, the conductive ceramics (perovskite oxide) forming the oxide electrode layer 34 desirably has open porosity of 20% or more, especially in a range of 30 to 50%, and desirably has a thickness of 30 to 100 μm, from the aspect of current-collecting property.

(Interconnector 35)

At a position facing the above oxide electrode layer 34 across the solid electrolyte layer 33, the fuel electrode layer 32, and the support base 31, the interconnector 35 disposed on the support base 31 is configured so as to contain lanthanum chromite-based perovskite oxide ($LaCrO_3$-based oxide), and is reduction-resistant and oxidation-resistant as exposed to the fuel gas (hydrogen) and the oxygen-containing gas. B1

Figure 3A:
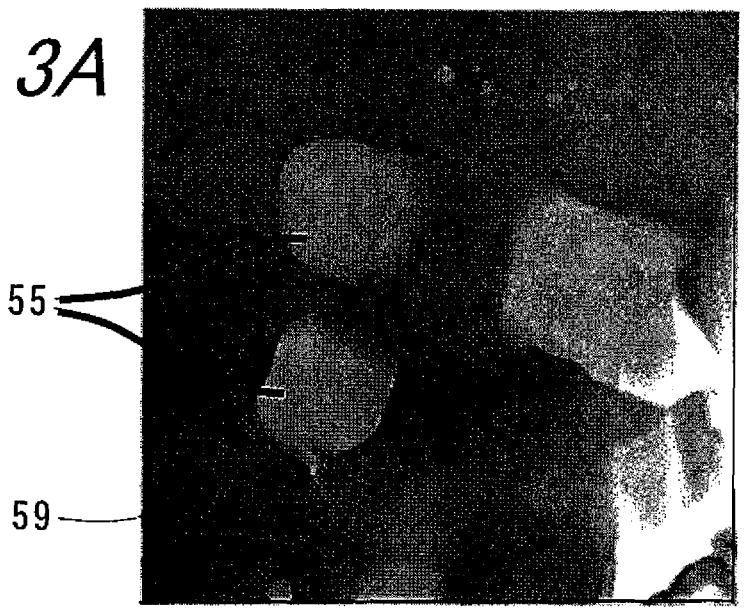
FIG. 3A is a TEM photograph of bright-field image before reduction and FIG. 3B is a TEM photograph of high-angle annular dark-field image before reduction.
Figure 3B:
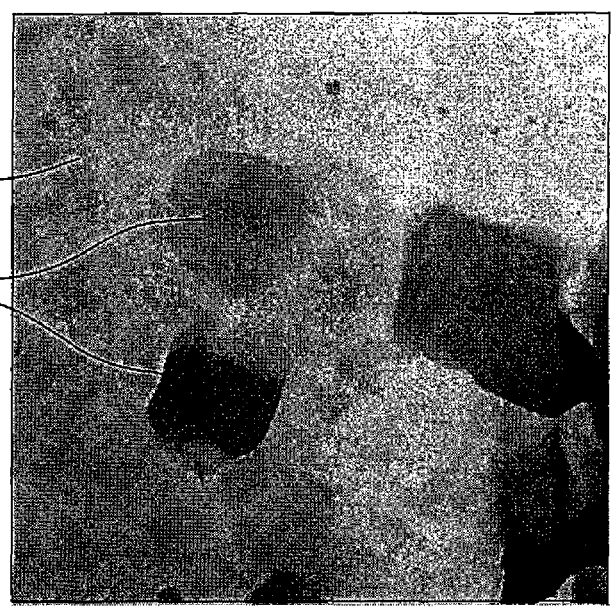
Figure 4A:
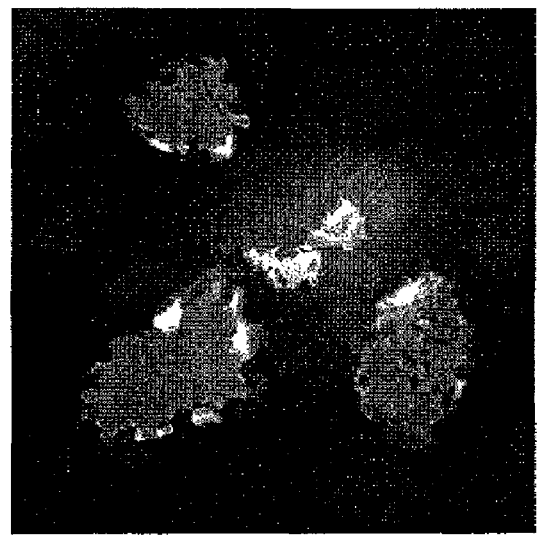
FIG. 4A is a TEM photograph of bright-field image after reduction.
Figure 4B:
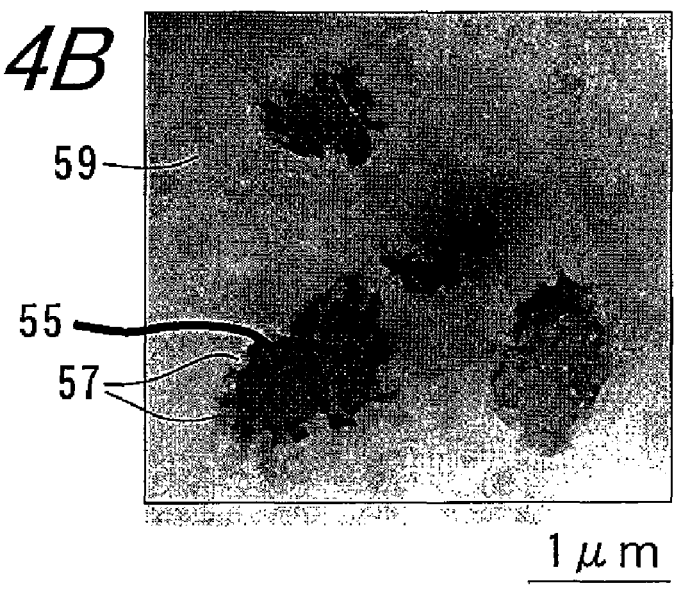
FIG. 4B is a TEN photograph of high-angle annular dark-field image before reduction.
Figure 4C:
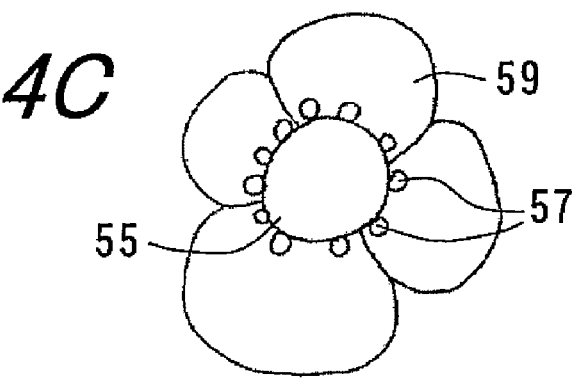
FIG. 4C is a schematic view.

The interconnector 35 is configured so as to contain the first composite oxide phase based on lanthanum chromite and the second composite oxide phase containing Mg and Ni. In the conductive sintered body as just stated, the second composite oxide phase 55 containing Mg and Ni in the oxidative atmosphere are as shown in FIGS. 3A and 3B, and when exposed to the reductive atmosphere, the second composite oxide phase 55 containing Mg and Ni has Ni 57 deposited around the second composite oxide phase, and then Ni oxide is converted to a metal Ni, thereby causing volume shrinkage and thus leading to shrinkage in the reductive atmosphere as shown in FIGS. 4A to 4C. Accordingly, the first composite oxide phase 59 based on lanthanum chromite in the conductive sintered body is reduced to expand while being reduced to shrink attributable to Ni 57 being separated from the second composite oxide phase 55 of Mg and Ni, which volume changes cancel each other out, thus making it possible to hold down the reduction-induced expansion of conductive sintered body.

Such an interconnector is 0.08% or less in an absolute value of coefficient of reduction-induced linear expansion, and will not largely change even when used as a cell component.

Assuming that the second composite oxide phase is represented by a composition formula $(Mg_{1-x}Ni_x)O$, it is desirable that $0.11 \leq x \leq 0.66$ be satisfied. Within such a range, an amount of metal Ni deposited around the second composite oxide phase is appropriate, and extent of the reduction-induced expansion of the first composite oxide phase based on lanthanum chromite is substantially equal to extent of the reduction-induced shrinkage of the metal Ni deposited around the second composite oxide phase so that the interconnector can be prevented from being reduced and expanding. In particular, it is desirable that $0.21 \leq x \leq 0.51$ be satisfied, from the aspects of inhibiting the interconnector from being reduced and expanding as well as of prevention of peel-off. Further, it is desirable that that a volume ratio of the second composite oxide phase of the invention be 10 to 30% by volume based on the total sintered body, from the aspect of maintaining the density.

Further, it is desirable that the interconnector of the invention contain an oxide phase of liquid phase forming component, for example, an $Y_2O_3$ phase. As a result, the fuel electrode layer, the solid electrolyte layer, etc., can be co-fired with the interconnector even at temperature lower than 1,500° C., for example, at 1,450° C., therefore making it possible to prevent Ni in the support base 31 from being diffused into the interconnector and to prevent Mg in the interconnector from being diffused into the support base 31, which situation allows for the interconnector to have a composition as designed and therefore makes it possible to prevent the interconnector from being reduced and expanding.

The oxide phase of liquid phase forming component such as $Y_2O_3$ as stated above exists in grain boundary between the first composite oxide phase and the second composite oxide phase, and is desirably 10 parts by mass or less in content based on 100 parts by mass in total of the first composite oxide phase and the second composite oxide phase containing Mg and Ni. In particular, it is desirable that the open porosity be set to be smaller and from the aspect of preventing $Y_2O_3$ from aggregating, the content be 1 to 5 parts by mass.

Moreover, in order to prevent the fuel gas passing through the support base 31 and the oxygen-containing gas passing outside the base support 31 from leaking, such conductive ceramics has to be dense and desirably has relative density of, for example, 93% or more and especially 95% or more, and also in terms of electric resistance, its thickness is desirably 10 to 200 μm. That is to say, the thickness smaller than the above range may result in a higher risk of gas leakage while the thickness larger than the above range may result in larger electric resistance and a potential drop causing degradation of current-collecting function.

It is preferable that an outer surface (upper surface) of the interconnector 35 be provided with a P-type semiconductor layer 39. That is to say, in the cell stack (refer to FIG. 2) composed of these fuel sells, the interconnector is connected to the conductive current collector 40, and by connecting the current collector 40 to the interconnector 35 with the P-type semiconductor layer 39 therebetween, connection between these two becomes an ohmic contact which decreases the potential drop and allows for effective avoidance of degradation in the current-collecting function, thus making it possible to, for example, effectively transmit current from the oxide electrode layer 24 of one fuel cell 30 to the support base 31 of another fuel cell 30. For such a P-type semiconductor, transition metal perovskite oxide may be cited as an example.

To be specific, usable is the P-type semiconductor ceramics larger in electron conductivity than that of $LaCrO_3$-based oxide constituting the interconnector 35, for example, being composed of at least one of $LaMnO_3$-based oxide, $LaFeO_3$-based oxide, $LaCoO_3$-based oxide, etc., where Mn, Fe, Co, etc. exist in B-sites. It is preferable that a thickness of such a P-type semiconductor layer 39 fall in a range of 30 to 100 μm, in general.

Further, the interconnector 35 can be provided directly on the flat portion A of support base 31 on which the solid electrolyte layer 33 is not provided, or alternatively, the fuel electrode layer 32 may be provided on the above portion and then the interconnector 35 may be provided on this fuel electrode layer 32. That is to say, the fuel electrode layer 32 may be provided over the entire periphery of the support base 31 and on this fuel electrode layer 32, the interconnector 35 may be provided. That is to say, in the case where the interconnector 35 is provided on the support base 31 with the fuel electrode layer 32 therebetween, the potential drop can be advantageously prevented at the interface between the support base 31 and the interconnector 35.

9

(Manufacture of Fuel Cell)

The fuel cell having the structure as above is manufactured as follows. First of all, for example, Ni or oxide powder thereof; $Y_2O_3$ powder, etc.; organic binder; and a solvent are mixed to prepare slurry, and through the extrusion molding using this slurry, a support base compact is fabricated and then dried.

Next, fuel electrode layer-forming materials (Ni or NiO powder and stabilized zircon a powder), organic binder, and a solvent are mixed to prepare slurry, and using the slurry, a sheet for fuel electrode layer is fabricated. In addition, instead of fabricating the sheet for fuel electrode layer, paste made of the fuel electrode-forming materials dispersed in the solvent may be applied to a predetermined position of the support base compact formed above, thereafter being dried to form a coating layer for fuel electrode layer.

Further, stabilized zirconia powder, organic binder, and a solvent are mixed to prepare the slurry, and using this slurry, a sheet for solid electrolyte layer is fabricated.

The support base compact, sheet for fuel electrode, and sheet for solid electrolyte layer formed as above are laminated so as to form, for example, a layer structure as shown in FIG. 1, and then dried. In this case, just the sheet for solid electrolyte layer only needs to be stacked on the support base compact and then dried in the case where the coating layer for fuel electrode layer is formed on a surface of the support base compact.

After that, materials for interconnector, organic binder, and a solvent are mixed to prepare slurry, and a sheet for interconnector is fabricated. For the materials for interconnector, usable are those obtained by addition of $La_2O_3$, $Cr_2O_3$, MgO, and NiO powder; those obtained by adding MgO powder and Ni powder to $LaCrO_3$-based oxide powder; and those obtained by adding composite oxide powder of Mg and Ni to $LaCrO_3$-based oxide powder. Alternatively, it is possible to use those obtained by adding oxide powder of liquid phase-forming component such as $Y_2O_3$, etc., to those materials for interconnector.

The sheet for interconnector is further stacked at predetermined position on the laminate obtained above to fabricate a laminate for firing.

Subsequently, the above laminate for firing is treated with debinderization and co-fired at 1,300 to 1,600° C. in oxygen-containing atmosphere, and to predetermined position of a sintered body thus obtained, paste containing oxygen electrode layer-forming materials (for example, $LaFeO_3$-based oxide powder) and a solvent, and according to need, paste containing P-type semiconductor layer-forming materials (for example, $LaFeO_3$-based oxide powder) and a solvent are applied by dipping and then burned in at 1,000 to 1,300° C., thereby allowing for manufacture of the fuel cell 30 of the invention having the structure shown in FIG. 1.

In particular, in the case where the support base and the interconnector are co-fired, it is possible to effectively avoid even mismatch of coefficients of thermal expansion. That is to say, relative to the coefficient of thermal expansion $12 \times 10^{-6}$ $K^{-1}$ of the fuel electrode support base, the coefficient of thermal expansion of lanthanum chromite in the interconnector is so small as $(9$ to $10) \times 10^{-6}$ $K^{-1}$ while the second composite oxide of Mg and Ni so large as $(16$ to $17) \times 10^{-6}$ $K^{-1}$, and according to blending ratio thereof, a desired coefficient of thermal expansion can be easily set, with the result that the invention can be favorably used. Moreover, the invention can be favorably used especially in the case of the fuel cell having a flat-tube shape which tends to be made small in thickness and therefore easily warped.

10

(Cell Stack)

The cell stack is constituted as shown in FIG. 2 by assembling a plurality of the above-described fuel cells 30 so that a current collector 40 made of a metal felt or a metal plate is interposed between one fuel cell 30 and another fuel cell 30 vertically adjacent thereto, both of which are connected to each other in series. That is to say, the support base 31 of the one fuel cell 30 is electrically connected to the oxide electrode layer 34 of the other fuel cell 30 by way of the interconnector 35, the P-type semiconductor layer 39, and the current collector 40. Further, the cell stacks as above are disposed side by side, and the adjacent cell stacks are connected to each other in series by conductive members 42.

The fuel cell apparatus is constituted, for example, by housing the cell stacks of FIG. 2 in a container 50. This container 50 is provided with an introduction pipe through which fuel gas such as hydrogen outside is introduced to the fuel cell 30, and an introduction pipe for introducing oxygen-containing gas such as air to outer space of the fuel cell 30, and when the fuel cell is heated to predetermined temperature (for example, 600 to 900° C.), power is generated while the fuel gas and oxygen-containing gas already used are discharged to the outside of the container 50.

Note that the invention is not limited to the above embodiment and may change in various ways within a range not changing the gist of the invention. For example, the shape of the support base 31 may be cylindrical, or an appropriately conductive intermediate layer may be formed between the oxide electrode layer 34 and the solid electrolyte layer 33. Furthermore, although explained in the above embodiment was the case where the fuel electrode layer 32 is formed on the support base 31, the support base itself may be provided with a function of the fuel electrode, and the solid electrolyte layer and the oxide electrode layer may be formed on the support base.

In addition, although explained in the above embodiment was the example where relative to the solid electrolyte layer the fuel electrode layer is formed on an inner side while the oxide electrode layer is formed on an outer side, it is a matter of course that the oxide electrode layer may be formed on an inner side of the solid electrolyte layer.

EXAMPLES

Example 1

Commercially available $La_2O_3$, $Cr_2O_3$, MgO, and NiO powder 99.9% in purity were mixed so as to have lanthanum chromate and NiO—MgO solid solution in the volume ratio of 90:10 and have Ni and Mg in the mol ratio x shown in Table 1, followed by 12-hour mixing through a ball mill using a zirconia-made ball and subsequently two-hour tentative firing at 1,300° C. to result in solid-phase reaction, thereafter 12-hour pulverization through the ball mill using a zirconia-made ball, whereby synthesized powder was prepared. This was then shaped into a square pillar which was 5 mm in height, 5 mm in width, and 45 mm in longitudinal length, and fired at 1,500° C. in the atmosphere.

Of the sintered body thus obtained, open porosity was measured in the Archimedes method and conductivity was measured in the four-terminal method (atmosphere, 850° C.). Further, 16-hour reduction treatment at 850° C. in reductive atmosphere under oxygen partial pressure of around $10^{-19}$ Pa was followed by natural cooling in the maintained reductive atmosphere, and the longitudinal lengths were measured with a micrometer before and after the reduction to determine coefficient of linear expansion ((longitudinal increase)/(longitudinal length immediately after sintering (before the reduction)) wherein the longitudinal increase represents a length obtained by subtracting the pre-reduction length from the post-reduction length.

Figure 5:
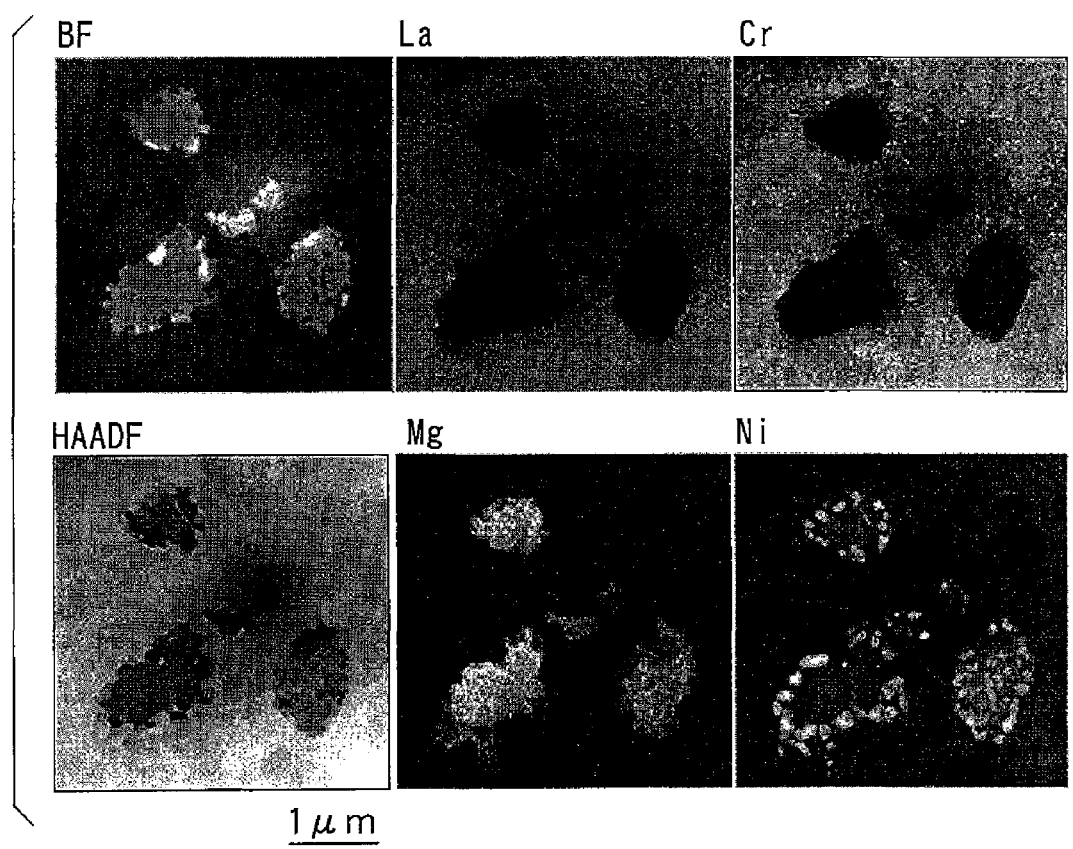
FIG. 5 is EDS mapping of La, Cr, Mg, and Ni of Sample No. 5.

Further, after the reduction, the conductivity was measured as well in the four-terminal method (in the reductive atmosphere under oxygen partial pressure of around $10^{-19}$ Pa, 850° C.). The result is shown in Table 1 (Samples No. 1 to 6). Moreover, of Sample No. 5, TEM (transmission electron microscope) photographs taken before the reduction are shown in FIGS. 3A and 3B while TEM photographs taken after the reduction are shown in FIGS. 4A to 4C, and after the reduction, element analysis was conducted by TEM-EDS (an energy-dispersive X-ray spectroscopic analyzer) of which La, Cr, Mg, and Ni distribution results were shown in FIG. 5. Note that among FIG. 3A, FIG. 3B, and FIGS. 4A to 4C, FIGS. 3A and 4A show bright-field images in TEM photographs with black background indicating the first composite oxide phase of lanthanum chromite; FIGS. 32 and 4B show high-angle annular dark-field images in TEM photographs with white background indicating the first composite oxide phase; and FIG. 4C is a schematic view of FIG. 4B.

Composition of NiO—MgO solid solution (the second composite oxide phase) was analyzed by TEM-EDS (an energy-dispersive X-ray spectroscopic analyzer) after the reduction. Since extrapolation relatively high in accuracy was adopted and a k factor (Cliff & Lorimer factor) corrected of a known sample was used in the TEM-EDS quantitative analysis, an error is considered to be around a few percentages.

TABLE 1

| Sample No. | Sintered body | | | Reductant | | Coefficient of reduction-induced linear expansion (%) |
|---|---|---|---|---|---|---|
| | Ratio Ni/(Ni + Mg) Mol ratio x | Open porosity (%) | Conductivity (S/cm) | Ratio Ni/(Ni + Mg) Mol ratio | Conductivity (S/cm) | |
| 1* | 0.00 | 0.1 | 2.8 | 0.00 | 0.01 | 0.20 |
| 2 | 0.11 | 0.6 | 5.7 | 0.10 | 0.02 | 0.08 |
| 3 | 0.21 | 0.9 | 7.8 | 0.15 | 0.07 | 0.02 |
| 4 | 0.35 | 1.2 | 9.6 | 0.15 | 0.08 | −0.02 |
| 5 | 0.51 | 1.4 | 10.8 | 0.16 | 0.08 | −0.04 |
| 6 | 0.66 | 1.5 | 11.1 | 0.15 | 0.09 | −0.05 |

An asterisk* indicates a sample out of the scope of the invention.
Samples No. 1 to 6 each contains NiO—MgO solid solution of about 10% in the volume ratio.
In the coefficient of linear expansion, plus indicates expansion while minus indicates shrinkage.

As is understood from the result in Table 1, the reduction-induced expansion is smaller along with increased Ni ratio and is reduced or shrinks below zero point. Further, it shows that density is high with the open porosity less than 2% and that the conductivity increases as the Ni ratio does, Furthermore, it shows almost the same values in the composition of NiO—MgO solid solution after the reduction since Ni is separated from the NiO—MgO solid solution by the reduction treatment.

Example 2

Slurry for support base formed of NiO powder and $Y_2O_3$ powder mixed in a weight ratio of 68:32 as well as a mixture of a porosity-providing agent, organic binder (polyvinyl alcohol), and water (solvent), was extruded to fabricate a support base compact having a flat-tube shaper and this was then dried.

Next, a fuel electrode layer-forming sheet was fabricated using slurry formed of a mixture of $ZrO_2$ (YSZ) powder containing 8 mol % $Y_2O_3$, NiO powder, organic binder (acrylic resin), and a solvent (toluene), and moreover a solid electrolyte layer sheet was fabricated using slurry formed of a mixture of the above YSZ powder, organic binder (acrylic resin), and a solvent of toluene, and these sheets were laminated.

This laminate sheet wrapped the above support base compact so as to have both ends thereof away from each other at a predetermined distance (refer to FIG. 1), and then was dried.

Meanwhile, slurry formed of a mixture of the synthesized powder fabricated in Example 1, organic binder (acrylic resin), and a solvent (toluene) was used to fabricate an interconnector sheet, and this sheet was stacked on the above-stated part of support base compact exposed from the laminate sheet, whereby fabricated was a laminate compact for sintering composed of the support base compact, the electrode layer sheet, the solid electrolyte layer sheet, and the interconnector sheet.

Next, the laminate compact for sintering was treated with debinderization and co-fired at 1,500° C. in atmosphere (Samples No. 7 to 12).

Before and after the reduction treatment conducted at 850° C. with hydrogen gas flowing inside and air flowing outside of the sintered body (cell) having a flat-tube shape thus obtained, longitudinal surface shapes were measured by a contact-type surface roughness meter, whereby a deformation amount of cell was determined. As to deformation of the cell, a tangent line was drawn from a cell surface to a straight line connecting both longitudinal ends of the cell, and a length of the longest tangent line was measured, of which difference resulting from the reduction is shown in Table 2 as a reduction-induced deformation amount.

In the meantime, a sintered body similarly fabricated was dipped in a paste made of $La_{0.6}Sr_{0.4}Co_{0.2}Fe_{0.8}O_3$ powder having an average particle size of 2 μm and a solvent (normal paraffin) so that a coating layer for oxide electrode layer is provided on a surface of a solid electrolyte layer formed on the sintered body, and at the same time, the above paste is applied to an outer surface of an interconnector formed on the sintered body so that a coating layer for P-type semiconductor is provided, followed by burning at 1,150° C., whereby the fuel cell as shown in FIG. 1 was fabricated.

In the fuel cell thus fabricated, the support base had the flat portion A 26 mm in length and the arcuate portion B 3.5 mm in length with a thickness of 2.8 nm; the fuel electrode layer had a thickness of 10 μm; the solid electrolyte layer had a thickness of 40 μm; the oxide electrode layer had a thickness of 50 μm; the interconnector had a thickness of 50 μm; and the P-type semiconductor layer had a thickness of 50 μm.

The fuel cell thus obtained was used to fabricate the cell stack of FIG. 2; hydrogen gas flows through a gas passage in the support base of the fuel cell, and furthermore, air flows outside (on an outer surface of the oxide electrode layer) of the fuel cell; power was generated for 100 hours at 850° C.; then, hydrogen gas was stopped, followed by natural cooling; the fuel cell was pressurized so as to shut out water and dipped into water to observe whether or not the gas leaked; cracks of the support base and the solid electrolyte layer, and peel-off of the solid electrolyte layer and the fuel electrode layer from the support base were observed with a stereomicroscope, and then all were stated in Table 2. Moreover, power generation performance per fuel cell was measured and stated in Table 2.

TABLE 2

| Sample No. | Sample No. in Table 1 | Amount of deformation caused by the reduction (μm) | Whether the gas leaked | Power generation performance (W/cm$^2$) |
|---|---|---|---|---|
| 7* | 1 | 350 | No leakage | 0.11 |
| 8 | 2 | 250 | No leakage | 0.23 |
| 9 | 3 | 150 | No leakage | 0.45 |
| 10 | 4 | 140 | No leakage | 0.45 |
| 11 | 5 | 140 | No leakage | 0.44 |
| 12 | 6 | 150 | No leakage | 0.45 |

An asterisk* indicates a sample out of the scope of the invention.

As is understood from the result in Table 2, in any of the cell, no gas leakage was found, and no clack and peel-off were observed in the solid electrolyte layer and the interconnector. Further, in Samples No. a to 12 of the invention, the power generation performance was 0.23 W/cm$^2$ or more which was good.

On the other hand, the power generation per cell was lower in Sample No. 7. This is considered to be that in the case of the cell provided with the interconnector having such a large coefficient of reduction-induced linear expansion as 0.20%, the cell largely deformed, causing the peel-off between the cells and therefore increasing the contact resistance.

Example 3

Commercially available La$_2$O$_3$, Cr$_2$O$_3$, MgO, and NiO powder 99.9% in purity were mixed so as to have lanthanum chromite and NiO—MgO solid solution in the volume ratio of 90:10 and have Ni and Mg in the mol ratio x shown in Table 3, followed by 12-hour mixing through a ball mill using a zirconia-made ball and subsequently three-hour tentative firing at 1,350° C. to result in solid-phase reaction, thereafter 12-hour pulverization through the ball mill using a zirconia-made ball, whereby synthesized powder was prepared. Relative to 100 parts by mass of this synthesized powder, 1 part by mass of Y$_2$O$_3$ was added and using polyvinyl alcohol as binder, this was then shaped into a square pillar which was 5 mm in height, 5 mm in width, and 45 mm in longitudinal length, and fired at 1,450° C. in the atmosphere.

Of the sintered body thus obtained, open porosity was measured In the Archimedes method and conductivity was measured in the four-terminal method (atmosphere, 850° C.). Further, 16-hour reduction treatment at 850° C. in reductive atmosphere under oxygen partial pressure of around $10^{-19}$ Pa was followed by natural cooling in the maintained reductive atmosphere, and the longitudinal lengths were measured with a micrometer before and after the reduction to determine coefficient of linear expansion ((longitudinal increase)/(longitudinal length immediately after sintering (before the reduction)) wherein the longitudinal increase represents a length obtained by subtracting the pre-reducation length from the post-reduction length.

Table 3 shows the results (Samples No. 13 to 18).

TABLE 3

| Sample No. | Sintered body Ratio Ni/(Ni + Mg) Mol ratio x | Amount of added liquid phase component (part by mass) | Firing temperature ° C. | Open porosity (%) | Conductivity (S/cm) | Coefficient of reduction-induced linear expansion (%) |
|---|---|---|---|---|---|---|
| 13* | 0.00 | Y$_2$O$_3$ 1 | 1,450° C. | 0.5 | 3.0 | 0.20 |
| 14 | 0.11 | Y$_2$O$_3$ 1 | 1,450° C. | 0.6 | 5.5 | 0.07 |
| 15 | 0.21 | Y$_2$O$_3$ 1 | 1,450° C. | 0.6 | 7.6 | −0.01 |
| 16 | 0.35 | Y$_2$O$_3$ 1 | 1,450° C. | 0.8 | 9.5 | −0.02 |
| 17 | 0.51 | Y$_2$O$_3$ 1 | 1,450° C. | 1.0 | 10.9 | −0.03 |
| 18 | 0.66 | Y$_2$O$_3$ 1 | 1,450° C. | 1.3 | 11.2 | −0.03 |
| 19 | 0.35 | Sc$_2$O$_3$ 1 | 1,450° C. | 0.9 | 9.0 | −0.02 |
| 20 | 0.35 | 0 | 1,450° C. | 2.5 | 4.5 | −0.05 |
| 21 | 0.35 | Y$_2$O$_3$ 1 | 1,450° C. | 0.8 | 5.5 | −0.02 |
| 22 | 0.35 | Y$_2$O$_3$ 2 | 1,450° C. | 0.7 | 5.5 | −0.02 |
| 23 | 0.35 | Y$_2$O$_3$ 5 | 1,450° C. | 0.6 | 5.6 | −0.02 |
| 24 | 0.35 | Y$_2$O$_3$ 10 | 1,450° C. | 0.5 | 5.8 | −0.03 |
| 25 | 0.35 | Y$_2$O$_3$ 1 | 1,450° C. | 0.8 | 5.5 | −0.02 |
| 26 | 0.35 | Y$_2$O$_3$ 1 | 1,450° C. | 0.8 | 5.5 | −0.02 |

An asterisk* indicates a sample out of the scope of the invention.
Samples No. 13 to 24 each contains NiO—MgO solid solution of about 10% in the volume ratio while Sample No. 25 contains it 12% and Sample No. 26 contains it 14%.
In the coefficient of linear expansion, plus indicates expansion while minus indicates shrinkage.

As is understood from the result in Table 3, the addition of Y$_2$O$_3$ leads to the open porosity of 1-3% or less even at a firing temperature of 1,450° C., which result indicates that the sintering property is high. Further, even comparing with Table 1 in the case where no Y$_2$O$_3$ was added, nearly the same characteristics were exhibited in the conductivity and the coefficient of reduction-induced linear expansion almost without any difference.

Example 4

Commercially available La$_2$O$_3$, Cr$_2$O$_3$, MgO, and N powder 99.9% in purity were mixed so as to have lanthanum chromite and NiO—MgO solid solution in the volume ratio of 90:10 and have Ni and Mg in the mol ratio x shown for Samples No. 19 to 26 in Table 3, followed by 12-hour mixing through a ball mill using a zirconia-made ball and subsequently three-hour tentative firing at 1,350° C. to result in solid-phase reaction, thereafter 12-hour pulverization through the ball mill using a zirconia-made ball, whereby synthesized powder was prepared. Relative to 100 parts by mass of this synthesized powder, $Y_2O_3$ and $Sc_2O_3$ were added so as to result in the amounts shown for Samples No. 19 to 26 in Table 3, and using polyvinyl alcohol as binder, this was then shaped into a square pillar which was 5 mm in height, 5 mm in width, and 45 mm in longitudinal length, and fired at 1,450° C. in the atmosphere.

Of the sintered body thus obtained, the porosity, the conductivity, and the coefficient of reduction-induced linear expansion were determined and shown in Table 3 (Samples No. 19 to 26).

As is understood from the result of Samples No. 20 to 24 in Table 3, the amount of $Y_2O_3$ added increases with decreased open porosity upon firing at 1,450° C. and thus with a better sintering property. Moreover, the amount of $Y_2O_3$ added makes almost no difference in the reduction-induced expansion, so that $Y_2O_3$ has no adverse effect. Furthermore, it can bee seen that the addition of $Y_2O_3$ of even 10 parts by mass does not largely change the conductivity.

Example 5 slurry for support base formed of NiO powder and $Y_2O_3$ powder mixed in a weight ratio of 68:32 as well as a mixture of a porosity-providing agent, organic binder (polyvinyl alcohol), and water (solvent), was extruded to fabricate a support base compact having a flat-tube shape, and this was then dried.

Next, a fuel electrode layer-forming sheet was fabricated using slurry formed of a mixture of $ZrO_2$ (YSZ) powder containing 8 mol % $Y_2O_3$, NiO powder, organic binder (acrylic resin), and a solvent (toluene), and moreover a solid electrolyte layer sheet was fabricated using slurry formed of a mixture of the above YSZ powder, organic binder (acrylic resin), and a solvent of toluene, and these sheets were laminated.

This laminate sheet wrapped the above support base compact so as to have both ends thereof away from each other at a predetermined distance (refer to FIG. 1), and then was dried.

Meanwhile, commercially available $La_2O_3$, $Cr_2O_3$, MgO, and NiO powder 99.9% in purity were mixed so as to have lanthanum chromite and NiO—MgO solid solution in the volume ratio of 90:10 and have Ni and Mg in the mol ratio x shown in Table 3, followed by 12-hour mixing through a ball mill using a zirconia-made ball and subsequently two-hour tentative firing at 1,300° C. to result in solid-phase reaction, thereafter 12-hour pulverization through the ball mill using a zirconia-made ball, whereby synthesized powder was prepared. Relative to this synthesized power, $Y_2O_3$ and $Sc_2O_3$ were added so as to result in the parts by weight shown in Table 3, and using slurry formed of a mixture of organic binder (acrylic resin) and a solvent (toluene), an interconnector sheet was fabricated, and this was stacked on the above-stated part of support base compact exposed from the laminate sheet, whereby fabricated was a laminate compact for sintering composed of the support base compact, the electrode layer sheet, the solid electrolyte layer sheet, and the interconnector sheet.

Next, the laminate compact for sintering was treated with debinderization and co-fired at 1,450° C. in atmosphere (Samples No. 27 to 38).

Before and after the reduction treatment conducted at 850° C. with hydrogen gas flowing inside and air flowing outside of the sintered body (cell) having a flat-tube shape thus obtained, longitudinal surface shapes were measured by a contact-type surface roughness meter, whereby a deformation amount of cell was determined. As to deformation of the cell, a tangent line was drawn from a cell surface to a straight line connecting both longitudinal ends of the cell, and a length of the longest tangent line was measured, of which difference resulting from the reduction is shown in Table 4 as a reduction-induced deformation amount.

In the meantime, to a sintered body similarly fabricated was applied a paste made of $La_{0.6}Sr_{0.4}Co_{0.2}Fe_{0.8}O_3$ powder having an average particle size of 2 μm and a solvent (isopropyl alcohol) so that a coating layer for oxide electrode layer is provided on a surface of a solid electrolyte layer formed on the sintered body, and at the same time, the above paste is applied to an outer surface of an interconnector formed on the sintered body so that a coating layer for P-type semiconductor is provided, followed by burning at 1,150° C., whereby the fuel cell as shown in FIG. 1 was fabricated.

In the fuel cell thus fabricated, the support base had the flat portion A 26 mm in length and the arcuate portion B 3.5 mm in length with a thickness of 2.8 mm; the fuel electrode layer had a thickness of 10 μm; the solid electrolyte layer had a thickness of 40 μm; the oxide electrode layer had a thickness of 50 μm; the interconnector had a thickness of 50 μm; and the P-type semiconductor layer had a thickness of 50 μm.

The fuel cell thus obtained was used to fabricate the cell stack of FIG. 2, hydrogen gas flows through a gas passage in the support base of the fuel cell, and furthermore, air flows outside (on an outer surface of the oxide electrode layer) of the fuel cell; power was generated for 100 hours at 850° C.; then, hydrogen gas was stopped, followed by natural cooling; the fuel cell was pressurized so as to shut out water and dipped into water to observe whether or not the gas leaked; cracks of the support base and the solid electrolyte layer, and peel-off of the solid electrolyte layer and the fuel electrode layer from the support base were observed with a stereomicroscope, and then all were stated in Table 4. Moreover, power generation performance per fuel cell was measured and stated in Table 4.

TABLE 4

| Sample No. | Sample No. in Table 3 | Amount of deformation caused by the reduction (μm) | Whether the gas leaked | Power generation performance (W/cm$^2$) |
|---|---|---|---|---|
| 27* | 13 | 300 | No leakage | 0.11 |
| 28 | 14 | 20 | No leakage | 0.23 |
| 29 | 15 | 20 | No leakage | 0.45 |
| 30 | 16 | 30 | No leakage | 0.45 |
| 31 | 17 | 25 | No leakage | 0.44 |
| 32 | 18 | 20 | No leakage | 0.43 |
| 33 | 19 | 30 | No leakage | 0.45 |
| 34 | 20 | — | leaked | — |
| 35 | 21 | 20 | No leakage | 0.44 |
| 36 | 22 | 20 | No leakage | 0.46 |
| 37 | 23 | 20 | No leakage | 0.44 |
| 38 | 24 | 20 | No leakage | 0.45 |

An asterisk* indicates a sample out of the scope of the invention.

As is understood from the result in Table 4, Samples No. 29 to 33 and 35 to 38 of the invention had such good power generation performance as to 0.40 W/cm$^2$ or more. Further, in the case were no $Y_2O_3$ was added (Sample No. 34), an interconnector material was used, and in the case of being co-fired with other components, sintering was not completed at 1,450° C. and gas leakage occurred, and moreover it was impossible to measure the amount of deformation caused by the reduction and also impossible to generate power.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

Industrial Applicability

According to the conductive sintered body of the invention, when the composite oxide phase of Mg and Ni in the oxidative atmosphere is exposed to the reductive atmosphere, Ni is separated from the second composite oxide phase of Mg and Ni and deposited around the second composite oxide phase so that the conductive sintered body can be prevented from being reduced and expanding, and the interconnector and the separator in the fuel cell can be formed in the co-sintering method which is low in industrial cost, and moreover the cell can be effectively prevented from deforming, cracking, and peel-off, with the result that higher long-term reliability can be expected.

The invention claimed is:

1. A conductive sintered body comprising:
   a first composite oxide phase comprising lanthanum chromite; and
   a second composite oxide phase different from the first composite oxide phase, the second composite oxide phase comprising a NiO-MgO solid solution, metal Ni being located around the second composite oxide phase.

2. The conductive sintered body of claim 1, further comprising a third oxide phase.

3. The conductive sintered body of claim 2, wherein the third oxide phase comprises a $Y_2O_3$ phase.

4. A conductive member for a fuel cell, comprising the conductive sintered body of claim 1.

5. A fuel cell having a solid electrolyte layer held between electrode layers and an interconnector comprising a conductive sintered body electrically connected to the electrode layers,
   the conductive sintered body comprising a first composite oxide phase comprising lanthanum chromite; a second composite oxide phase different from the first composite oxide phase, the second composite oxide phase comprising NiO-MgO solid solution; and metal Ni located around the second composite oxide phase.

6. The fuel cell of claim 5, wherein one of the electrode layers holding the solid electrolyte layer therebetween is an oxygen electrode layer, the other of the electrode layers is a fuel electrode layer containing Ni, and the interconnector is provided on the fuel electrode layer.

7. A fuel cell apparatus having a plurality of the fuel cells of claim 5 housed in a container.

8. The fuel cell of claim 5, further comprising a conductive support,
   wherein one of the electrode layers holding the solid electrolyte layer therebetween is an oxygen electrode layer, the other of the electrode layers is a fuel electrode layer containing Ni, the fuel electrode layer is supported by the conductive support, and the interconnector is provided on the conductive support.

9. The fuel cell of claim 5, wherein the conductive sintered body further comprises a third oxide phase.

10. The fuel cell of claim 9, wherein the third oxide phase comprises a $Y_2O_3$ phase.

* * * * *